United States Patent
D'herbemont et al.

(10) Patent No.: US 6,738,632 B2
(45) Date of Patent: May 18, 2004

(54) MOBILE TELECOMMUNICATIONS SYSTEM WITH IMPROVED MANAGEMENT OF ITS RADIO RESOURCES

(75) Inventors: Luc D'herbemont, Paris (FR); Alain Durighello, Palaiseau (FR); Thierry Garcin, Paris (FR); Francois Gouere, Jouars Pontchartrain (FR)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/290,618

(22) Filed: Nov. 8, 2002

(65) Prior Publication Data

US 2003/0092439 A1 May 15, 2003

(30) Foreign Application Priority Data

Nov. 12, 2001 (EP) .............................. 01309518

(51) Int. Cl.⁷ ................................ H04Q 7/20
(52) U.S. Cl. .................... 455/458; 455/435.1
(58) Field of Search ............... 455/403, 422.1, 455/435.1, 433, 435.2, 458, 515; 370/328

(56) References Cited

U.S. PATENT DOCUMENTS

| | | | | |
|---|---|---|---|---|
| 6,081,723 A | | 6/2000 | Mademann | 455/456 |
| 6,137,791 A | * | 10/2000 | Frid et al. | 370/352 |
| 6,230,009 B1 | * | 5/2001 | Holmes et al. | 455/426.1 |
| 6,275,706 B1 | * | 8/2001 | Rune | 455/456.1 |
| 6,397,065 B1 | * | 5/2002 | Huusko et al. | 455/435.2 |

FOREIGN PATENT DOCUMENTS

| WO | WO 99/52317 | 10/1999 | H04Q/7/38 |
|---|---|---|---|
| WO | WO 02/01907 A1 | 1/2002 | H04Q/7/38 |

* cited by examiner

*Primary Examiner*—Nay Maung
*Assistant Examiner*—Nick Corsaro

(57) ABSTRACT

A UMTS type mobile radio telecommunications system with improved management of its radio resources is disclosed, the system comprising a core network communicating by means of a UTRAN network with a plurality of user equipment. The core network including a mobile switching center or MSC and at least one serving GPRS support node or SGSN. The interface between the MSC and at least one SGSN is designed to give the SGSN the identity of the user equipment in the connected mode with the MSC. Furthermore, to page one of the user equipment in the connected mode with the MSC, the SGSN communicates with this user equipment through the MSC. The effect of this is to eliminate the unnecessary sending of paging messages through the paging channels of the system.

6 Claims, 3 Drawing Sheets

MOBILE TELECOMMUNICATIONS SYSTEM WITH IMPROVED MANAGEMENT OF ITS RADIO RESOURCES

CROSS REFERENCE TO RELATED APPLICATION

This application claims priority of European Application No. 01309518.7 filed on Nov. 12, 2001.

FIELD OF THE INVENTION

The present invention relates to a UMTS (Universal Mobile Telephone System) type mobile radio telecommunications system with improved management of its radio resources.

BACKGROUND OF THE INVENTION

In its classic form, a UMTS type telecommunications system consists of a core network, a Universal Terrestrial Radio Access Network (UTRAN) and mobile terminals commonly called user equipment (UEs). A system of this kind is shown in FIG. 1. The core network comprises a mobile switching center (MSC) referenced 10, linked to the public switched telephone network for the circuit switching service and a serving GPRS support node (SGSN) referenced 11, linked to the Internet for the packet switching service. The MSC 10 communicates with the SGSN 11 through an interface Gs. The UTRAN consists of a plurality of radio network controllers (RNCs) referenced 20 to 23, each controlling a set of logic elements called nodes B. Each RNC is connected to the MSC 10 and to the SGSN 11 of a core network by means of an interface Iu. The RNCs are also connected to one another by means of an interface Iur. Finally, each UE is connected to one or more nodes B through a radio interface, each node B serving a geographical zone called a cell.

In the example of FIG. 1, the UTRAN has four RNCs 20, 21, 22 and 23 and each RNC controls two or three nodes B. A UE 30 is linked with one of the nodes B coming under the RNC 21.

The geographical zone that groups together the cells controlled by the RNCs coming under the MSC is called an LA or location area and the geographical zone that groups together the cells controlled by the RNCs coming under the SGSN is called an RA or routing area. In the example of FIG. 1, these two zones are identical. However, it is not rare for several SGSNs to be associated with one and the same MSC. In this case, each SGSN has its own routing area and the location area covers all the routing areas of the SGSNs associated with the MSC.

The UEs have two operation modes: an idle mode and a connected mode. In the idle mode, no system resource is allocated specifically to the conveyance of data to and from the UE. The UE is in the idle mode for example after it has been powered on. In this mode, whenever the UE changes its routing area or location area, an update operation is activated to update the location registers of the network.

The UE goes into the connected mode when a connection is made to the system. Thus, as soon as the data has to be transmitted to a UE in the idle mode, the core network uses the UTRAN network to send a paging message to the UE concerned, asking it to go into the connected mode. The UE may also go into the connected mode on its own initiative.

In the connected mode, the UE can take four states known as mobility states, each corresponding to a given level of activity of the UE.

In the CELL_DCH state, a dedicated channel (DCH) is assigned to the UE for the upward link and the downward link.

In the CELL_FACH state, no dedicated physical channel is assigned to the UE. This UE constantly listens to a common channel FACH (or forward access channel) in the downward link of the cell considered. For the upward link, it can use a random-access channel (RACH). In both these states, the localization of the UE is known at the cell level. Whenever the UE changes its cell, it updates the network with its new cell location.

In the CELL-PCH state, the UE monitors only the paging channel (PCH) of the cell considered. If it changes its cell, it goes into the CELL_FACH state to update the network with its new cell location.

A fourth state in the connected mode, called URA_PCH, is also possible. A URA (UTRAN registration area) designates a geographical zone grouping cells that may be controlled as the case may be by different RNCs. The URA_PCH (UTRAN registration area paging channel) state is similar to the CELL_PCH state apart from the fact that the network is updated only when the UE changes its URA. In this state, the localization of the UE is only known at the URA level.

These four mobility states as well as the transitions between them are described in greater detail in the technical specification "3GPP TS 25.331 V3.5.0" of the Radio Access Network Group, Section 7, pp. 30–32 and Appendix B, pp. 615–622, updated in September 2001.

When a connection between a UE and the core network is set up, it generally makes transit through the RNC controlling the cell in which the UE is located. When the UE moves, the connection is maintained through other cells that may be controlled by other RNCs. The connection makes transit through several RNCs between the UE and the core network. The serving RNC, or SRNC, then designates the RNC directly linked with the core network for a given connection between the UE and the core network. The SRNC generally corresponds to the RNC used when the connection is made. The drift RNCs, or DRNCs, designate the RNCs through which the call makes transit but which are not directly linked with the core network for this connection.

In such a system, a part of the radio resources is allocated to the paging channel (PCH). The paging channel is a transport channel of the downward link that is constantly transmitted by each node B to the entire cell. This channel is used by the UTRAN to contact a UE when it is in the idle mode or in the connected mode in the CELL_PCH or URA_PCH state.

The radio resources in a cell type system are not unlimited. They are used to provide an entire set of services, especially the paging service. If paging requirements of the system can be reduced, then it will be possible to reduce the size of the radio resources allocated to the paging channel and thus allocate more radio resources to the other services of the system (for example to convey voice or data).

An aim of the invention is to reduce the paging requirements of the system in order to reduce the size of the radio resources allocated to the paging channel in a UMTS system.

Indeed, the paging channel requirements of the presently used UMTS system are great. Let us take the example of a UE 30 communicating with the MSC 10 as shown in FIG. 2. The UE 30 which is in a CELL_DCH or CELL_FACH state is connected with the MSC 10 through the SRNC 20 and the DRNC 21. This connection is represented by an arrow with dotted lines going from MSC 10 to the UE 30. The SGSN 11 then tries to transmit signalling information and/or data packets to the UE 30. The SGSN 11 therefore sends paging messages in the zone RA that is associated with it to contact the UE 30. It therefore transmits messages to the RNCs 20, 21, 22 and 23, asking them to send paging messages into the cells that they control.

At the UTRAN, the RNC 20 is the SRNC for the connection in progress of the UE 30. As the case may be, the RNC 21, acting as a DRNC for the connection in progress, also knows the state of the UE 30. These two RNCs are the only ones to know that the UE 30 is already in the connected mode with the MSC. The other RNCs perceive the UE 30 as being in the idle mode. The result of this is that the RNCs 22, 23 unnecessarily send paging messages through the paging channels of the cells that they control.

If the UE 30 is in the URA_PCH state, the situation is somewhat identical. All the RNCs controlling the cells of the RA zone send paging messages and therefore all the RNCs controlling cells outside the URA unnecessarily send paging messages, except for the SRNC which does not send paging messages if it is outside the URA.

Finally, if the UE 30 is in a CELL_PCH state, all the RNCs controlling the cells of the RA zone, other than the SRNC and the DRNC controlling the cell in which the UE 30 is located if it is distinct from the SRNC, also unnecessarily send paging messages.

SUMMARY OF THE INVENTION

It is observed that the radio resources allocated to the paging channel are unnecessarily encumbered in the present system. This arises chiefly out of lack of coordination between the different elements of the core network and of the UTRAN.

It is therefore an aim of the invention to eliminate any unnecessary sending of paging messages through the paging channel in order to release radio resources for the other services of the network.

An object of the invention is a mobile radio telecommunications system comprising a core network communicating by means of a UTRAN network with a plurality of user equipment, said core network comprising a mobile switching center and at least one serving GPRS support node, each user equipment being able to work selectively in two operating modes, firstly a connected mode in which the resources of the system are allocated to setting up a connection between the user equipment and the mobile switching center and/or at least one serving GPRS support node, and secondly an idle mode, characterized in that the mobile switching center and said at least one serving GPRS support node communicate by means of an interface, said interface being designed to give said at least one serving GPRS support node the identity of the user equipment in the connected mode with said mobile switching center, and in that, to page one of the user equipment in the connected mode with the mobile switching center, the at least one serving GPRS support node communicates with the user equipment through the mobile switching center.

As an alternative embodiment, the interface between the mobile switching center and the at least one serving GPRS support mode gives the at least one serving GPRS support node not only the identity of the user equipment in the connected mode with said mobile switching center but also the identity of the serving radio network controllers for the corresponding connections. The at least one serving GPRS support node then directly transmits the paging messages to the serving radio network controllers without going through the mobile switching center.

BRIEF DESCRIPTION OF THE DRAWINGS

The characteristics and advantages of the invention shall appear more clearly from the following detailed description made with reference to the appended drawings, of which.

DETAILED DESCRIPTION

According to the invention, the Gs interface between the MSC 10 and the SGSN 11 is modified so that the SGSN 11 is regularly informed of the identity of the UEs in the connected mode with the MSC 10.

The information on the identity of the UEs in the connected mode is transmitted to the SGSN 11 either on the request of this SGSN 11 or on the initiative of the MSC 10. In the latter case, the information is for example sent periodically to the SGSN 11 or as soon as a UE goes into the connected mode with the MSC 10.

When the SGSN 11 seeks to contact a UE, it verifies whether or not this UE is already in the connected mode with the MSC 10. If this is not the case, it sends paging messages to all the cells of the associated RA. If it is the case, it sends a paging message to the MSC 10 which transmits it to the UE through its connection with its UE.

Thus, the MSC 10 will carry out maximum paging only for cells under the control of the SRNC 20 and/or the DRNC 21. If the UE is in a CELL_DCH or CELL_FACH state, the paging message is transmitted to the DCH or FACH channel with the data coming from the MSC 10. This case is illustrated in FIG. 3 which has to be compared with FIG. 2.

Figure 1:
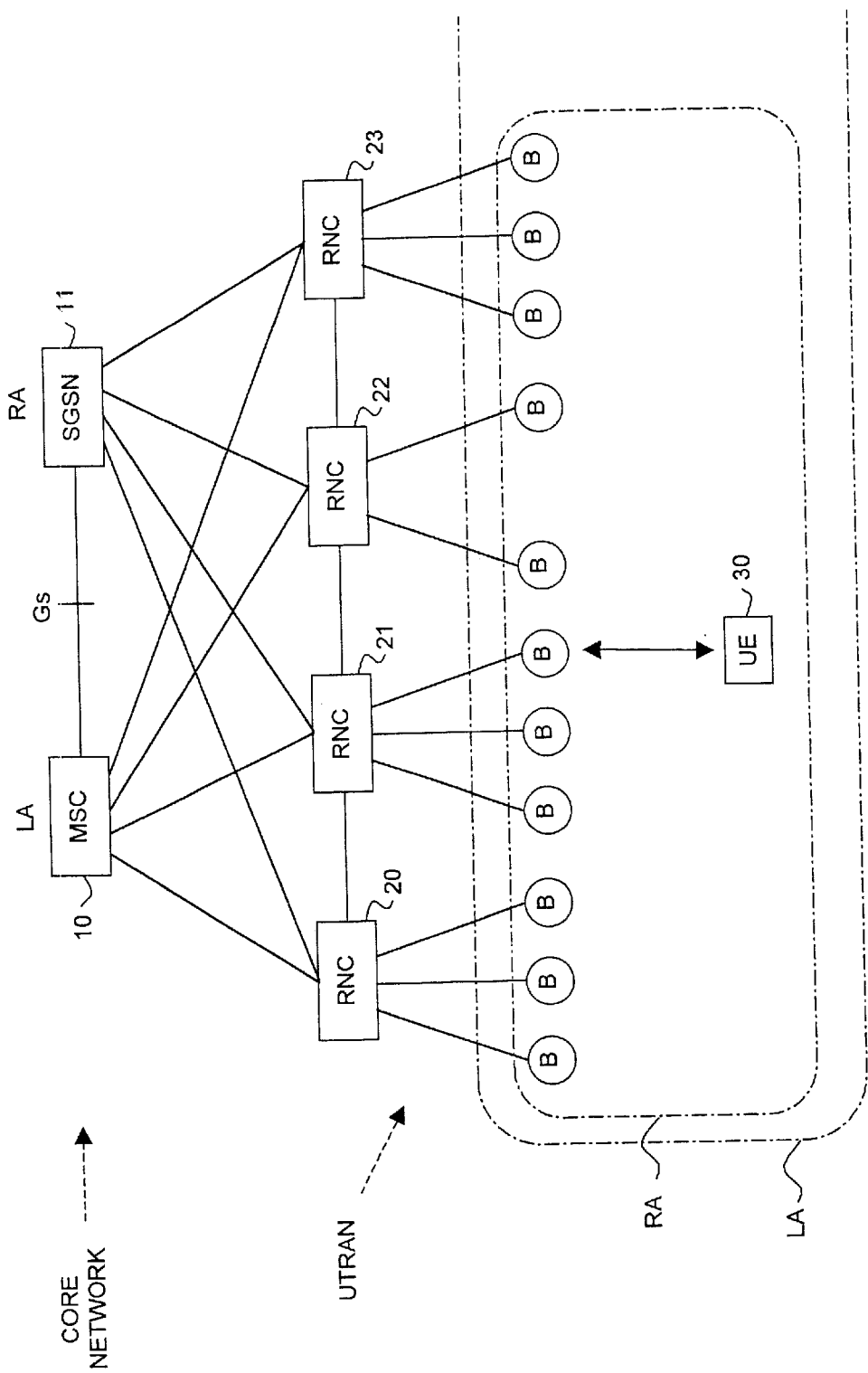
FIG. 1, already described, represents the architecture of a standard UMTS system.
Figure 2:
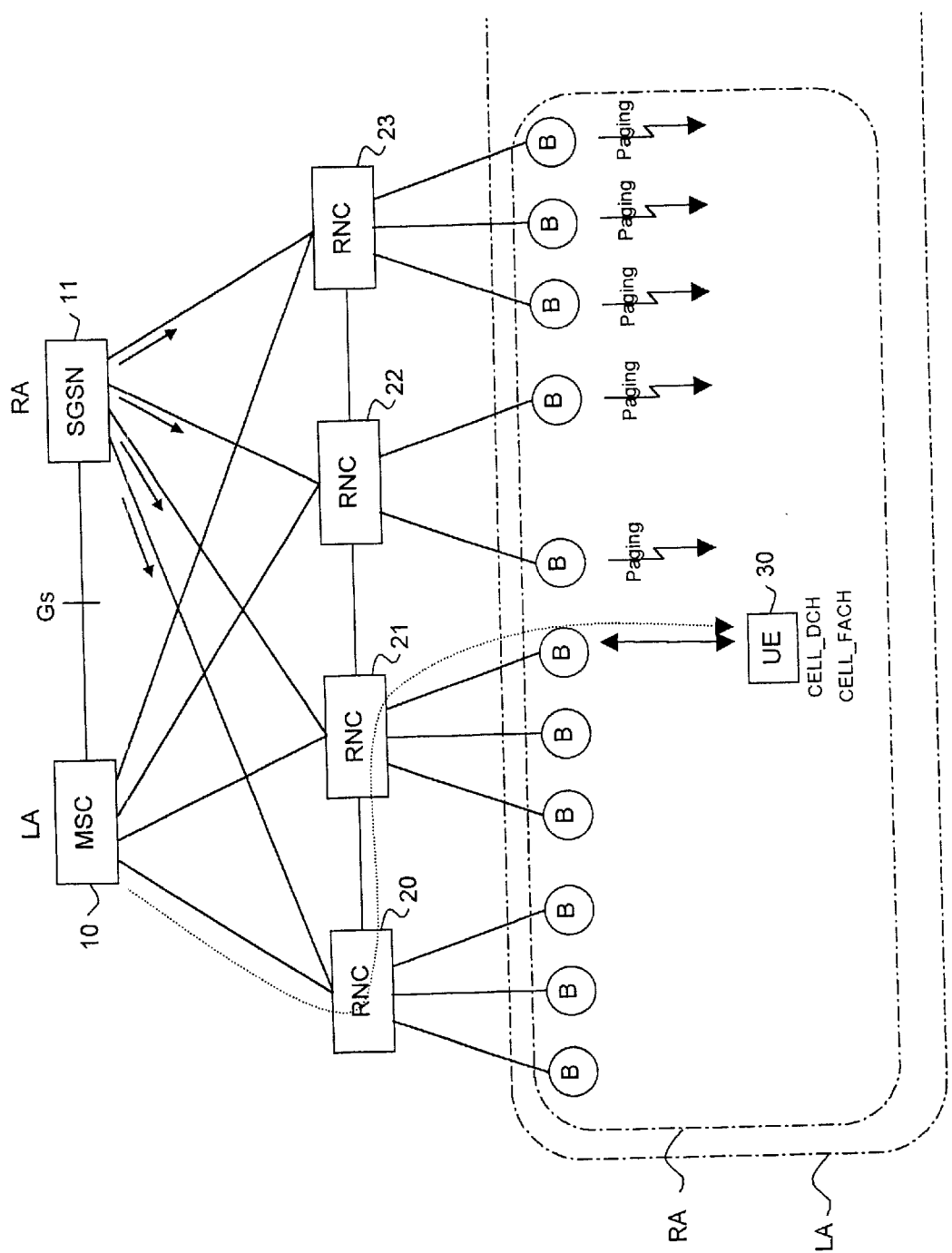
FIG. 2 illustrates an example of the management of the radio resources allocated to the paging channel in a prior art system.
Figure 3:
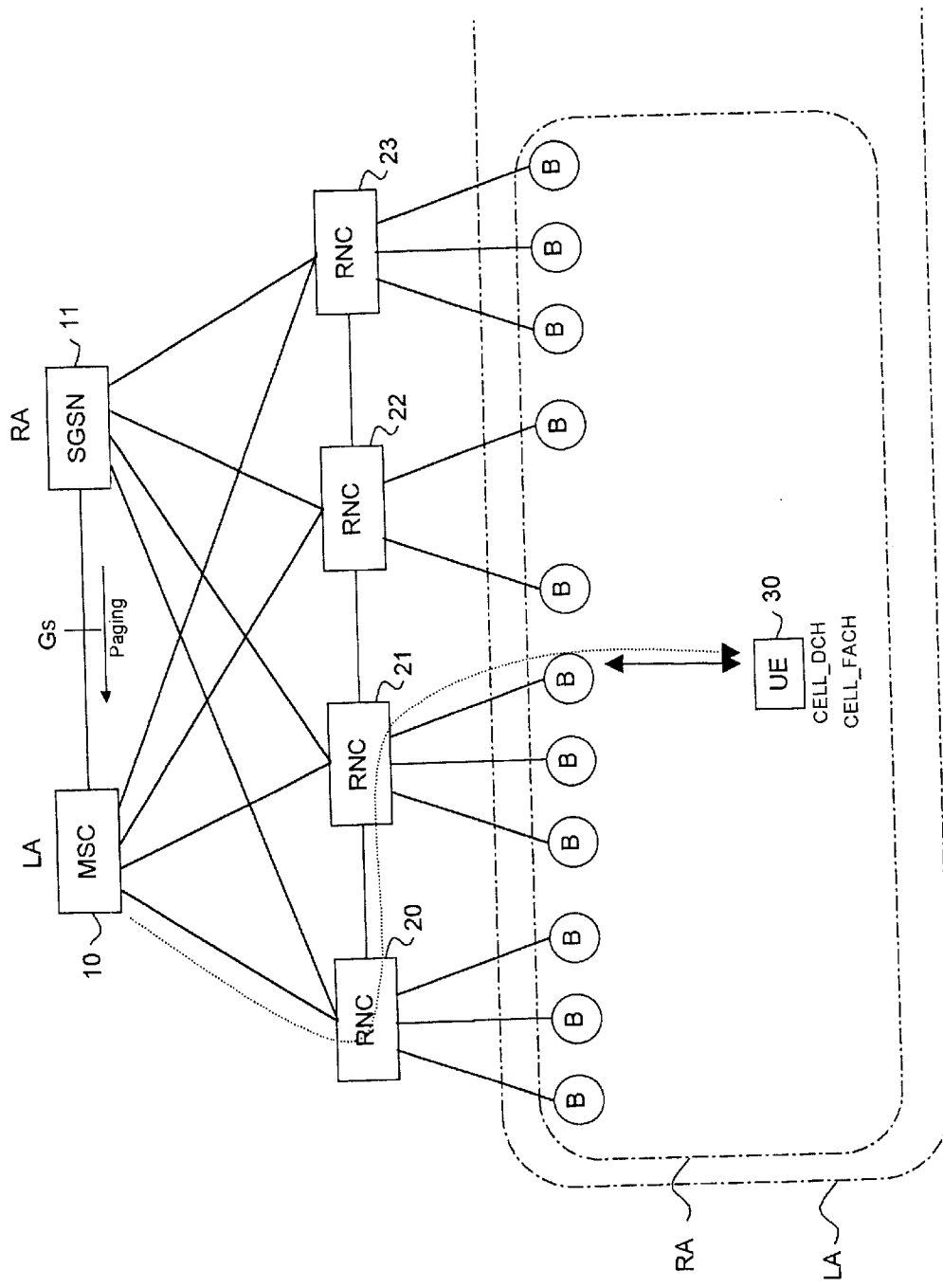
FIG. 3 illustrates an example of the management of the radio resources allocated to the paging channel in a system according to the invention.

In this figure, the SGSN 11 seeks to contact the UE 30 in the connected mode with the MSC 10 and, as in FIG. 2, the UE 30 is in a CELL_DCH or CELL_FACH state.

According to the invention, the SGSN 11 knows that the UE 30 is in the connected mode with the MSC 10. The SGSN 11 therefore sends a paging message to the MSC 10 which will retransmit this message to the UE 30 in the channel (DCH or FACH) used to transmit data to the UE 30. The unnecessary dispatch of paging messages through the cells controlled by the RNCs 21, 22 and 23 is thus avoided.

Similarly, if the UE 30 is in a URA_PCH state, the paging message coming from the MSC 10 will be broadcast only through the paging channel of the cells belonging to the URA. Finally, if the UE 30 is in a CELL_PCH state, the paging message will be sent only through the paging channel of the concerned cell.

This system substantially limits the use of the paging channels of the radio resources.

As a variant, the interface Gs is further modified to give the SGSN not only the identity of the user UEs in connected mode with the MSC but also the identity of the SRNCs for the corresponding connections. The SGSN then directly transmits the paging message to the SRNC without going through the MSC.

What is claimed:

1. A mobile radio telecommunications system comprising a core network communicating by means of a UTRAN network with a plurality of user equipment, said core network comprising a mobile switching center and at least one serving GPRS support node, each user equipment being able to work selectively in two operating modes, firstly a connected mode in which the resources of the system are allocated to setting up a connection between the user equipment and said mobile switching center and/or at least one serving GPRS support node, and secondly an idle mode, characterized in that said mobile switching center and said at least one serving GPRS support node communicate by means of an interface, said interface being designed to give said at least one serving GPRS support node the identity of the user equipment in the connected mode with said mobile switching center, and in that said interface is furthermore designed to give said at least one serving GPRS support node the identity of radio network controllers with which said mobile switching center is linked to communicate with said user equipment in the connected mode, and in that, to page one of the user eguipment in the connected mode with said mobile switching center, said at least one serving GPRS support node directly communicates with a concerned serving radio network controller without going through said mobile switching center.

2. The system according to claim 1, further characterized in that said interface gives the identity of the user equipment in the connected mode with said mobile switching center upon a request from said at least one serving GPRS support node.

3. The system according to claim 1, further characterized in that said interface gives the identities of the user equipment in the connected mode with said mobile switching center regularly on the initiative of the mobile switching center.

4. The system of claim 2 further characterized in that upon the request from said at least one serving GPRS support node said interface also gives the identity of the radio network controllers with which said mobile switching center is linked to communicate with said user equipment in the connected mode.

5. The system of claim 3 further characterized in that regularly on the initiative of the mobile switching center said interface also gives the identity of the radio network controllers with which said mobile switching center is linked to communicate with said user equipment on the connected mode.

6. A mobile radio telecommunications system comprising a core network communicating by means of a UTRAN network with a plurality of user equipment, said core network comprising a mobile switching center and at least one serving GPRS support node, each user equipment being able to work selectively in two operating modes, firstly a connected mode in which the resources of the system are allocated to setting up a connection between the user equipment and said mobile switching center and/or at least one serving GPRS support node, and secondly an idle mode, characterized in that said mobile switching center and said at least one serving GPRS support node communicate by means of an interface, said interface being designed to give said at least one serving GPRS support node the identity of the user equipment in the connected mode with said mobile switching center, and in that, to page one of the user equipment in the connected mode with said mobile switching center, said at least one serving GPRS support node communicates with said one user equipment through said mobile switching center, further characterized in that said interface is furthermore designed to give said at least one serving GPRS support node the identity of radio network controllers with which said mobile switching center is linked to communicate with said user equipment in the connected mode, and in that, to page one of the user equipment in the connected mode with said mobile switching center, said at least one serving GPRS support node directly communicates with a concerned serving radio network controller instead of going through said mobile switching center.

* * * * *